United States Patent [19]

McCulley et al.

[11] Patent Number: 5,032,018
[45] Date of Patent: Jul. 16, 1991

[54] EYEGLASS STRAP APPARATUS

[76] Inventors: William S. McCulley, 1623 Glorietta, Coronado, Calif. 92118; Craig A. Herrington, 12199 Via Elena, El Cajon, Calif. 92019

[21] Appl. No.: 434,213

[22] Filed: Nov. 13, 1989

[51] Int. Cl.⁵ .......................... G02C 5/14; G02C 3/00
[52] U.S. Cl. ..................................... 351/156; 351/157
[58] Field of Search ...................... 351/123, 156, 157; 2/13, 452; 24/3 C

[56] References Cited

U.S. PATENT DOCUMENTS 4,696,556  9/1987  Perry ............................. 351/156 X

FOREIGN PATENT DOCUMENTS 2605756  10/1990  United Kingdom ................ 351/156

Primary Examiner—Rodney B. Bovernick

[57] ABSTRACT

An eyeglass strap apparatus (10) for frictionally securing the arms (101) of a pair of eyeglasses (100) to the sides of a user's head wherein the apparatus includes an elongated strap member (13) having a pair of friction members (17) formed on opposite ends wherein the combined length (L, L') of the strap member (13) is chosen so as to be loosely suspended from the arms (101) of the eyeglasses (100) and/or such that the intermediate portion (20) of the strap member (13) may be wrapped in turban fashion around the user's head to serve as a sweatband.

3 Claims, 1 Drawing Sheet

EYEGLASS STRAP APPARATUS

TECHNICAL FIELD

The present invention relates in general to eyeglass strap constructions, and more particularly to multi-use elongated eyeglass strap constructions which permit the user to suspend the eyeglasses at a level fairly low on their upper torso when not in use.

BACKGROUND ART

The present invention relates to an improved version of the subject matter of U.S. Pat. No. 4,848,861 which issued on July 18, 1989 and was entitled "Earpiece Cushion Apparatus for Eyeglasses", and a novel variation of the subject matter of U.S. Pat. No. 4,133,604 which issued to Robert B. Fuller on Jan. 9, 1979 and was entitled "Eyeglass Retainer".

As can be seen by reference to the patent, this eyeglass strap comprises a length of resilient material which is joined together at its ends to create tubular members which are dimensioned to frictionally engage the earpiece arms of a pair of eyeglasses wherein the length of material is specifically dimensioned to create resilient force on the ends of the earpieces when the eyeglass strap is stretched across the back of the user's head.

While the Fuller device is more than adequate for serving the particular function for which it was specifically designed and constructed, this particular device is not particularly well suited for those individuals who are bothered by rearward pressure being exerted on the bridge of their noses by the resilient force applied by the device.

In addition, there are also many people who would prefer to have their eyeglasses suspended from their necks a substantial distance below the level possible through use of the relatively short strap length provided by Fuller.

As a consequence of the foregoing situation, there has existed a longstanding need among people who wear eyeglasses for a new eyeglass strap construction which will not only provide a secure frictional engagement between the ends of the eyeglass strap and the user's head without creating a rearward pressure on the user's nose while deployed in its operative disposition and, which also will allow the user to suspend their eyeglasses fairly low on their upper torso when they are not using their glasses.

Furthermore, there has been an equally pressing need for an eyeglass strap construction which will serve a utilitarian function above and beyond those currently served by any other existing eyeglass strap construction and the provision of such a device is a stated objective of the present invention.

DISCLOSURE OF THE INVENTION

Briefly stated, the eyeglass strap construction which forms the basis of the present invention comprises a relatively elongated strap unit having friction units formed on the opposite ends of the strap unit.

The strap unit comprises an elongated length of resilient material having a longitudinal dimension in excess of twenty-four inches wherein the minimum length is chosen for reasons that will be explained presently.

The friction units comprise enlarged and contoured earpiece members which are joined together along their opposed edges to form a friction element having a specific configuration wherein the friction units are formed from the enlarged ends of the strap member.

In addition, the earpiece members are specifically configured to be compressed between the user's ear and the side of the user's head wherein only the aforementioned frictional compression and gravity serve to keep the eyeglasses in place on the user's head without the benefit of any resilient force being exerted through stretching of the resilient strap material across the back of the user's head.

As mentioned previously, the specific dimension of the length of the present eyeglass strap construction was chosen such that when the strap is disposed in at least one operative mode of deployment around the back of the user's head, there will be no resilient deformation of the intermediate portion of the eyeglass strap.

Furthermore, in another version of the preferred embodiment of this invention, the length of the strap unit is substantially increased and the intermediate portion of the strap unit is significantly enlarged such that the enlarged central portion of the strap unit will function as a headband/sweatband when the strap unit is completely wrapped around the user's head.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
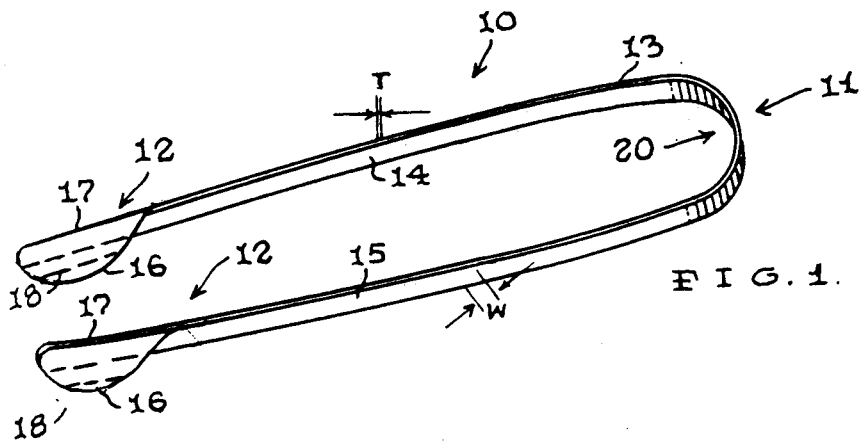
FIG. 1 is an isolated perspective view of the first version of the preferred embodiment.

Referring now to the drawings, wherein like reference numerals designate identical or corresponding parts throughout the several views, FIG. 1 depicts the eyeglass strap construction (10) which forms the basis of the present invention. The strap construction (10) comprises in general a strap unit (11), and a pair of friction units (12) disposed on the opposite ends of the strap unit (11). These units will now be described in seriatim fashion.

Figure 2:
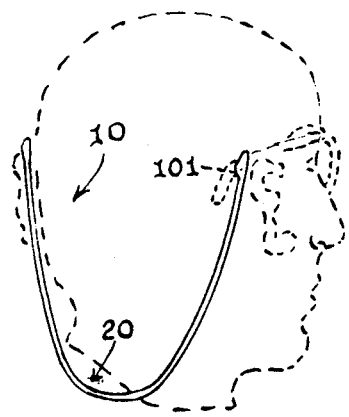
FIG. 2 is a perspective view of the first version attached to a pair of eyeglasses with the user's head depicted in phantom.
Figure 4:
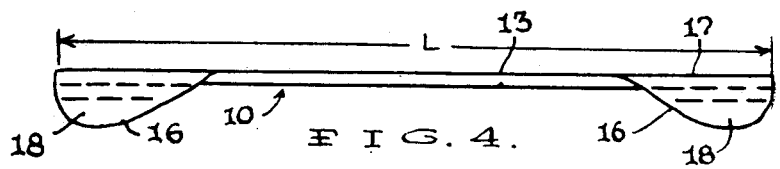
FIG. 4 is a top plan view of the first version of the invention.

As shown in FIGS. 1, 2 and 4, in the first version of the preferred embodiment of this invention, the strap unit (11) comprises an elongated strap member (13) having a generally uniform width "W" and thickness "T" along the length of the strap unit (11) wherein the strap member (13) includes a multi-layer construction fabricated from an elongated strip of high coefficient friction generally resilient material (14) such as foam rubber having a generally smooth layer of cloth fabric (15) such as rayon, nylon or the like, secured to one side of the strip of resilient material by any suitable means, such as adhesives, sewing, heat sealing or the like.

Still referring to FIGS. 1, 2 and 4, it can be seen that the friction units (12) are formed on the opposite ends of the elongated strap member (13) and comprise enlarged and contoured generally bell-shaped end portions (16) of the strip of resilient material (14) and the layer of fabric (15) which are joined together along a portion of their fabric covered opposed edges to form a generally open tubular friction member (17) having an enlarged downwardly depending tapered wedge element (18) formed thereon wherein the resilient friction material (14) is disposed on the outside of the friction member (17).

Prior to embarking upon a detailed description of the second version of the invention, it should once again be emphasized that in the first version of the preferred embodiment of the invention, the combined length "L" of the strap unit (11) and the friction unit (12) has a minimum value of X=24 inches, whereby the strap construction (109) will suspend the eyeglasses below the midpoint of the user's chest when the eyeglasses (100) are not being operatively deployed and, the strap member (14) will be suspended from the arms (101) of the eyeglasses in an untensioned pronounced loop, wherein the intermediate portion (20) of the strap member (14) will be suspended below the juncture of the user's neck and shoulders when the eyeglasses (100) are being employed in their intended manner.

In addition, the intermediate portion (20) of the strap member (14) will have a generally uniform width "W" and thickness "T" relative to the remainder of the strap member (14) in the first version of the preferred embodiment.

Figure 3:
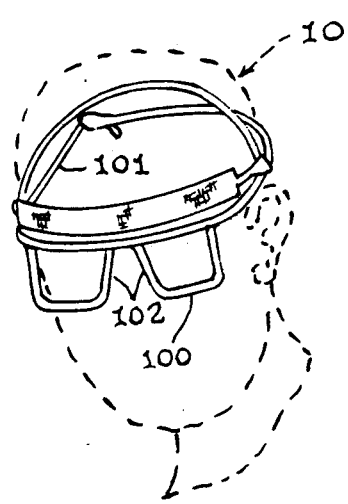
FIG. 3 is an isolated perspective view of the second version of the preferred embodiment with the eyeglasses and the user's head depicted in phantom.
Figure 5:
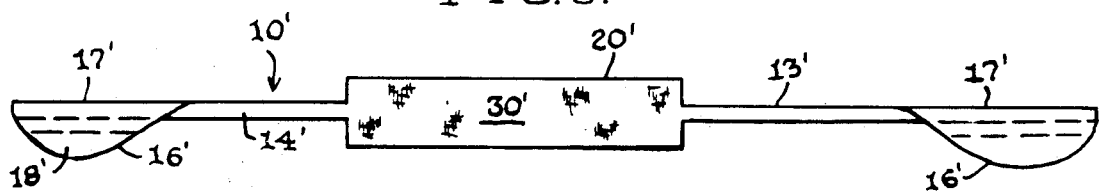
FIG. 5 is a top plan view of the second version of the invention.

In the second version of the preferred embodiment depicted in FIGS. 3 and 5, the eyeglass strap construction (10') is basically identical to the strap construction (10) of the first version with the following notable exception: the combined length "L" of the strap unit (11) and the friction units (12) and the width "W" and thickness "T" of the intermediate portion (20) of the strap unit (11).

As can best be seen by reference to FIGS. 4 and 5, the combined length "L" of the strap unit (11) and the friction unit (12) of the first version of the strap construction has a minimum value "X" and the combined length "L" of the second version of the strap construction has a minimum value of X'=X+($\frac{1}{2}$X×Y) wherein "Y" is an integer and X=24 inches.

In addition, the minimum values of the width "W'" and thickness "T'" of the second version relative to the first version are as follows: W'=(L×W) wherein "L" is an integer equal to or grater than two and, T'=(Y×T) wherein "Y" is an integer.

Turning now particularly to FIG. 3, it can be appreciated that in the second version of the preferred strap construction (10'), the strap member (14') is supra elongated and dimensioned to be wrapped in a turban fashion completely around the user's head wherein, the intermediate portion (20') of the strap member (14') is both dimensioned and intended to serve as with a sweatband or a headband (30') relative to the user's forehead.

It should also be appreciated that in the second version when the strap construction (10') is deployed as illustrated in FIG. 3, a resilient tension will be established between the ends of the strap construction and the arms (101) of the eyeglasses (100) wherein the tension required to maintain the headband (30') in place on the user's forehead will be transmitted through the arms (101) of the eyeglasses (100) to resiliently urge the nosepieces (102) of the eyeglasses (100) against the bridge of the user's nose.

Obviously, the second version of the strap construction (10') is particularly well suited for strenuous warm weather sport's activities such as tennis, volleyball, basketball, and the like wherein, at the present time both a headband and an eyeglass strap are independently employed. However, now with the advent of the present dual function strap construction (10'), the user only needs one piece of equipment—instead of two.

Along those same lines, the intermediate portion (20') of the second strap construction (10') will of necessity have different width "W'" and thickness "T'" dimensions from the width "W" and thickness "T" of the remainder of the strap member (14') in order for the intermediate portion (20') of the strap member (14') to function as a headband or sweatband (30').

Therefore, while the thickness "T'" of the headband (30') may be equal to the thickness "T" of the remainder of the strap member (14'), the width "W'" of the headband (30') must of necessity be at least twice as wide as the width (W) of the remainder of the strap member (14').

It should also be noted at this junction that when the strap member (14') of the second version of the strap construction (10') is not being used in the headband configuration, the strap member (14') may either be deployed in a long loop which extends down the user's back or the strap member (14') may be looped around the user's neck in a necklace fashion. In the first mentioned instance, the strap member (14') will suspend the user's eyeglasses (100) proximate to or below the user's waist when the eyeglasses are not being used and, in the second instance, the strap member (14') will suspend the eyeglasses above the user's waist due to the loop of the strap member (14') that is wrapped around the user's neck. Furthermore, the enlarged intermediate portion (20') will serve as a padded neck piece for the apparatus (10').

Having thereby described the subject matter of this invention, it should be apparent that many substitutions, modifications and variations of the invention are possible in light of the above teachings. It is therefore to be understood that the invention as taught and described herein is only to be limited to the extend of the breadth and scope of the appended claims.

We claim:

1. An eyeglass strap apparatus for frictionally engaging the arms of a pair of conventional eyeglasses wherein the apparatus comprises:
   a strap unit including an elongated strap member having an enlarged intermediate headband portion disposed between the ends of the strap member; wherein, the intermediate head band portion has a width that is at least approximately twice the width of the said strap member; and,
   a pair of friction members formed on the ends of the strap member for frictionally engaging the said eyeglass arms; wherein, the elongated strap member is dimensioned to encircle the users head when the friction members are operatively engaged with said eyeglass arms.

2. The apparatus as in claim 1; wherein at least portions of the elongated strap member are resilient.

3. The apparatus as in claim 2 wherein the friction units comprise:
   a generally tubular friction member formed on opposite ends of the elongated strap member wherein each friction member is provided with an enlarged generally bell-shaped end portion.

* * * * *